United States Patent
Davis et al.

(10) Patent No.: US 8,196,692 B2
(45) Date of Patent: *Jun. 12, 2012

(54) TWO PERSON RUV WITH ERGONOMIC SEATING AND FEET PLACEMENT

(75) Inventors: Richard A. Davis, Mequon, WI (US);
Eric A. Davis, Mequon, WI (US);
Russell R. Kleiser, Kemah, TX (US)

(73) Assignee: American Off-Road Technologies, LLC, Mequon, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/408,354

(22) Filed: Mar. 20, 2009

(65) Prior Publication Data

US 2009/0250282 A1 Oct. 8, 2009

Related U.S. Application Data

(63) Continuation of application No. 11/841,230, filed on Aug. 20, 2007, now Pat. No. 7,506,714, which is a continuation of application No. 10/735,091, filed on Dec. 12, 2003, now Pat. No. 7,258,192, which is a continuation-in-part of application No. 09/717,508, filed on Nov. 21, 2000, now Pat. No. 6,755,269.

(51) Int. Cl.
*B62D 21/00* (2006.01)
*B62D 39/00* (2006.01)

(52) U.S. Cl. . 180/89.1; 180/312; 180/90.6; 297/195.12; 296/1.02

(58) Field of Classification Search ............ 180/89.1, 180/90.6, 311, 312, 908; 296/1.02, 63, 71, 296/75; 297/195.12

See application file for complete search history.

(56) References Cited

U.S. PATENT DOCUMENTS

| | | | |
|---|---|---|---|
| 3,896,499 | A | 7/1975 | Kelly |
| 4,247,030 | A | 1/1981 | Amacker |
| 4,269,084 | A | 5/1981 | Okajima |
| 4,426,796 | A | 1/1984 | Spademan |
| 4,451,057 | A | 5/1984 | Lawson |
| 4,458,910 | A | 7/1984 | Stillwagon |
| 4,527,831 | A | 7/1985 | Katsuoka |
| 4,563,038 | A | 1/1986 | Hirose |
| 4,664,208 | A | 5/1987 | Horiuchi et al. |
| 4,691,963 | A | 9/1987 | Mikuniya et al. |
| D299,324 | S | 1/1989 | Oba et al. |
| 4,804,221 | A | 2/1989 | Saiki |

(Continued)

FOREIGN PATENT DOCUMENTS

EP 0953499 A2 11/1999

(Continued)

OTHER PUBLICATIONS

Bombardier Recreational Products, Inc. (BRP), "2006 World Tour" Sea-Doo, BRP brochure; 32 pages; brp.com and sea-doo.com; printed in the United States.

(Continued)

*Primary Examiner* — Paul N Dickson
*Assistant Examiner* — Barry Gooden, Jr.
(74) *Attorney, Agent, or Firm* — Whyte Hirschboeck Dudek S.C.

(57) ABSTRACT

A two or more person RUV (recreational utility vehicle) is provided with a multi-place multi-planar saddle seat assembly, multi-place multi-planar foot board assemblies, and grip handles.

11 Claims, 15 Drawing Sheets

U.S. PATENT DOCUMENTS

| | | | | |
|---|---|---|---|---|
| 4,969,373 | A | 11/1990 | Good | |
| 4,998,966 | A | 3/1991 | Yamaguchi | |
| 5,078,026 | A | 1/1992 | Giffin | |
| 5,217,245 | A | 6/1993 | Guy | |
| 5,456,138 | A | 10/1995 | Nutile et al. | |
| 5,467,839 | A | 11/1995 | Yoshio | |
| 5,527,061 | A | 6/1996 | Karl | |
| 5,544,937 | A | 8/1996 | Hanagan | |
| 5,597,180 | A | 1/1997 | Ganzel | |
| 5,699,872 | A | 12/1997 | Miyakawa et al. | |
| 5,716,042 | A | 2/1998 | Derviller | |
| 5,746,275 | A | 5/1998 | Cross et al. | |
| 5,794,976 | A | 8/1998 | Stevicks | |
| 5,845,918 | A | 12/1998 | Grinde et al. | |
| 5,882,017 | A | 3/1999 | Carleer | |
| 5,893,424 | A | 4/1999 | Hisada | |
| 5,915,329 | A | 6/1999 | Watkins et al. | |
| D415,448 | S | 10/1999 | Deutschman | |
| 5,975,624 | A | 11/1999 | Rasidescu et al. | |
| 6,116,630 | A | 9/2000 | Thomas | |
| 6,139,247 | A | 10/2000 | Wright | |
| 6,182,784 | B1 | 2/2001 | Pestotnik | |
| 6,206,121 | B1 | 3/2001 | Michel | |
| 6,270,106 | B1 | 8/2001 | Maki et al. | |
| 6,279,931 | B1 | 8/2001 | Kopczynski | |
| 6,296,073 | B1 | 10/2001 | Rioux et al. | |
| 6,340,186 | B2 | 1/2002 | Johnson et al. | |
| 6,340,210 | B1 | 1/2002 | Handa et al. | |
| 6,343,669 | B2 | 2/2002 | Davis et al. | |
| 6,357,542 | B1 | 3/2002 | Sako | |
| 6,659,566 | B2 | 12/2003 | Bombardier | |
| 6,755,269 | B1 | 6/2004 | Davis et al. | |
| 6,799,781 | B2 | 10/2004 | Rasidescu et al. | |
| 6,968,917 | B2 | 11/2005 | Rondeau et al. | |
| 6,981,695 | B1 | 1/2006 | Hedlund et al. | |
| 7,258,192 | B2 * | 8/2007 | Davis et al. | 180/312 |
| 7,331,418 | B2 * | 2/2008 | Audet | 180/312 |
| 7,506,714 | B2 * | 3/2009 | Davis et al. | 180/89.1 |
| 2002/0117843 | A1 | 8/2002 | Rasidescu et al. | |
| 2003/0102694 | A1 | 6/2003 | Rondeau et al. | |
| 2004/0031640 | A1 | 2/2004 | Tweet | |

FOREIGN PATENT DOCUMENTS

| | | |
|---|---|---|
| JP | 2000-313318 | 11/2000 |

OTHER PUBLICATIONS

Honda Motor Co., Inc., "Off-Road—Honda, 2005" brochure; 12 pages, printed in the United States of America.
Honda Motor Co., Inc., "2006 Sportbikes—Honda" brochure; 12 pages, printed in the United States of America.
Honda Motor Co., Inc., "2006 Cruisers—Honda" brochure; 12 pages, printed in the United States of America.
Honda Motor Co., Inc., "2006 Rincon—Honda" brochure; 6 pages, printed in the United States of America.
Honda Motor Co., Inc., "2006 Utility ATV—Honda" brochure; 12 pages, printed in the United States of America.
Honda Motor Co., Inc., "Sportrax 400EX, 300EX, 250EX, 90-Honda, 2004" brochure; 7 pages, printed in the United States of America.
Kawasaki Motors Corp., "2006 Sport ATV" brochure; 8 pages, printed in the United States of America.
Kawasaki Motors Corp., "2006 Ninja ZX-14" brochure; 10 pages, printed in the United States of America.
Kawasaki Motors Corp., "2006 Premium Cruiser" brochure; 24 pages, printed in the United States of America.
Kawasaki Motors Corp., "2006 Light Cruiser" brochure; 6 pages, printed in the United States of America.
Kawasaki Motors Corp., "2006 Motorcross" brochure; 16 pages, printed in the United States of America.
Kawasaki Motors Corp., "2006 Dual Purpose" brochure; 4 pages, printed in the United States of America.
Kawasaki Motors Corp., "2006 Off-Road" brochure; 12 pages, printed in the United States of America.
Kawasaki Motors Corp., "2005 Sportbike" brochure; 14 pages, printed in the United States of America.
Kawasaki Motors Corp., "2006 Sport" brochure; 12 pages, printed in the United States of America.
Kawasaki Motors Corp., "2006 Super Sport" brochure; 11 pages, printed in the United States of America.
Kawasaki Motors Corp., "2006 Brute Force 650 4x4i" brochure; 6 pages, printed in the United States of America.
Kawasaki Motors Corp., "2006 Utility ATV" brochure; 16 pages, printed in the United States of America.

* cited by examiner

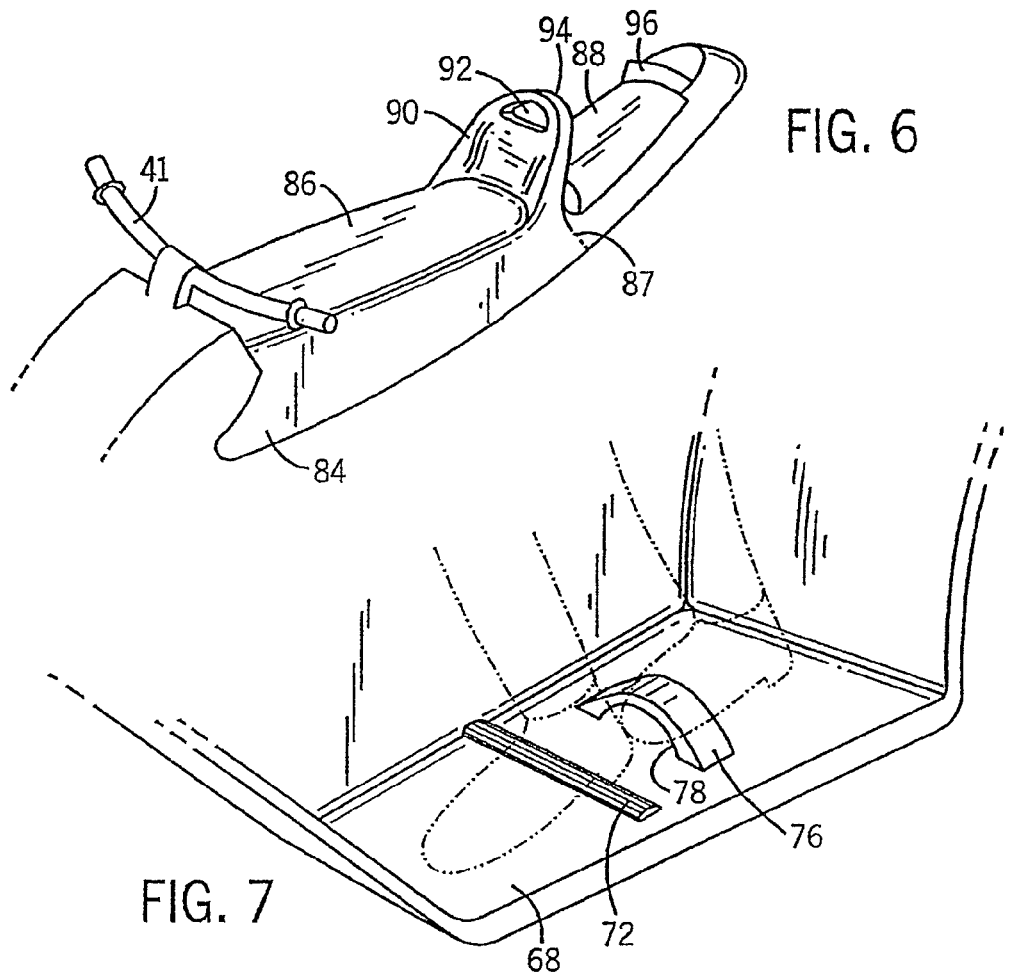

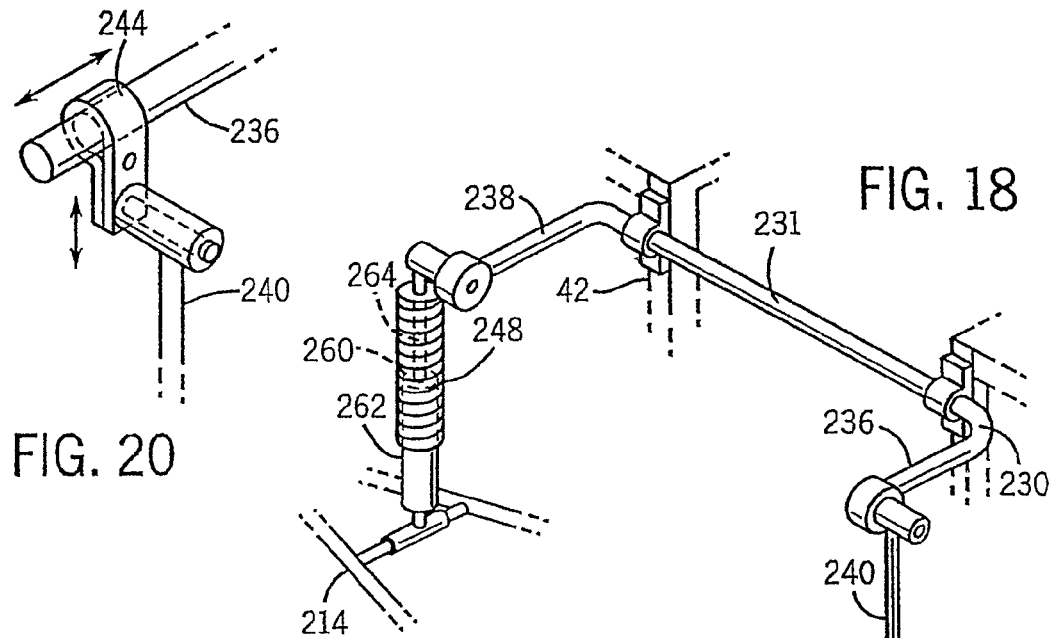
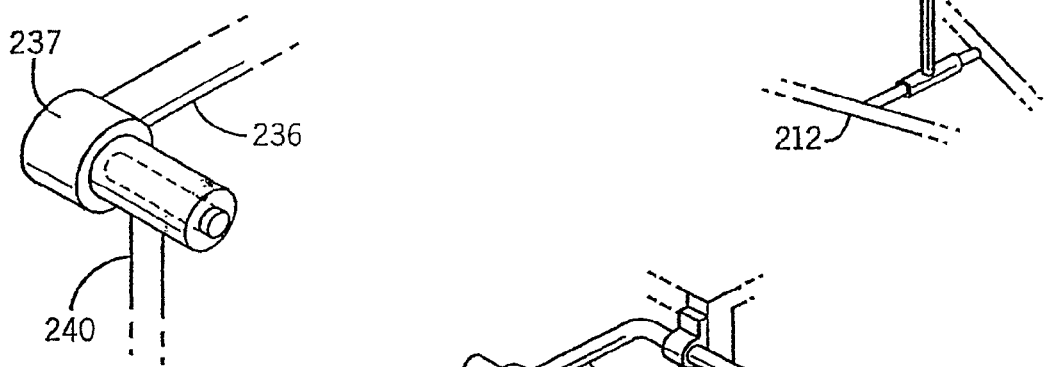
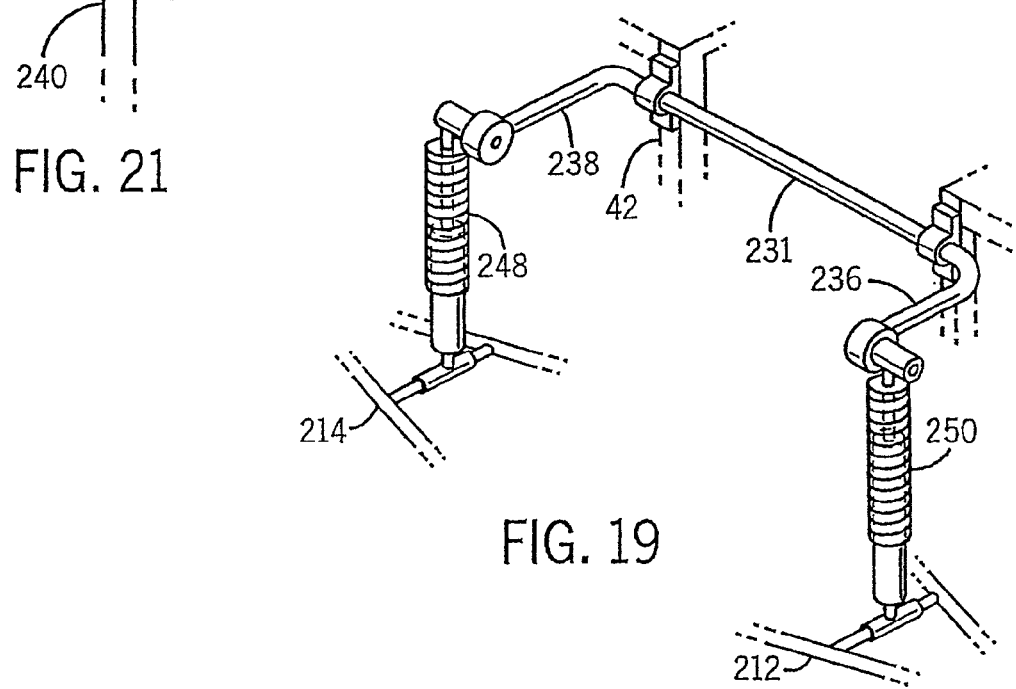

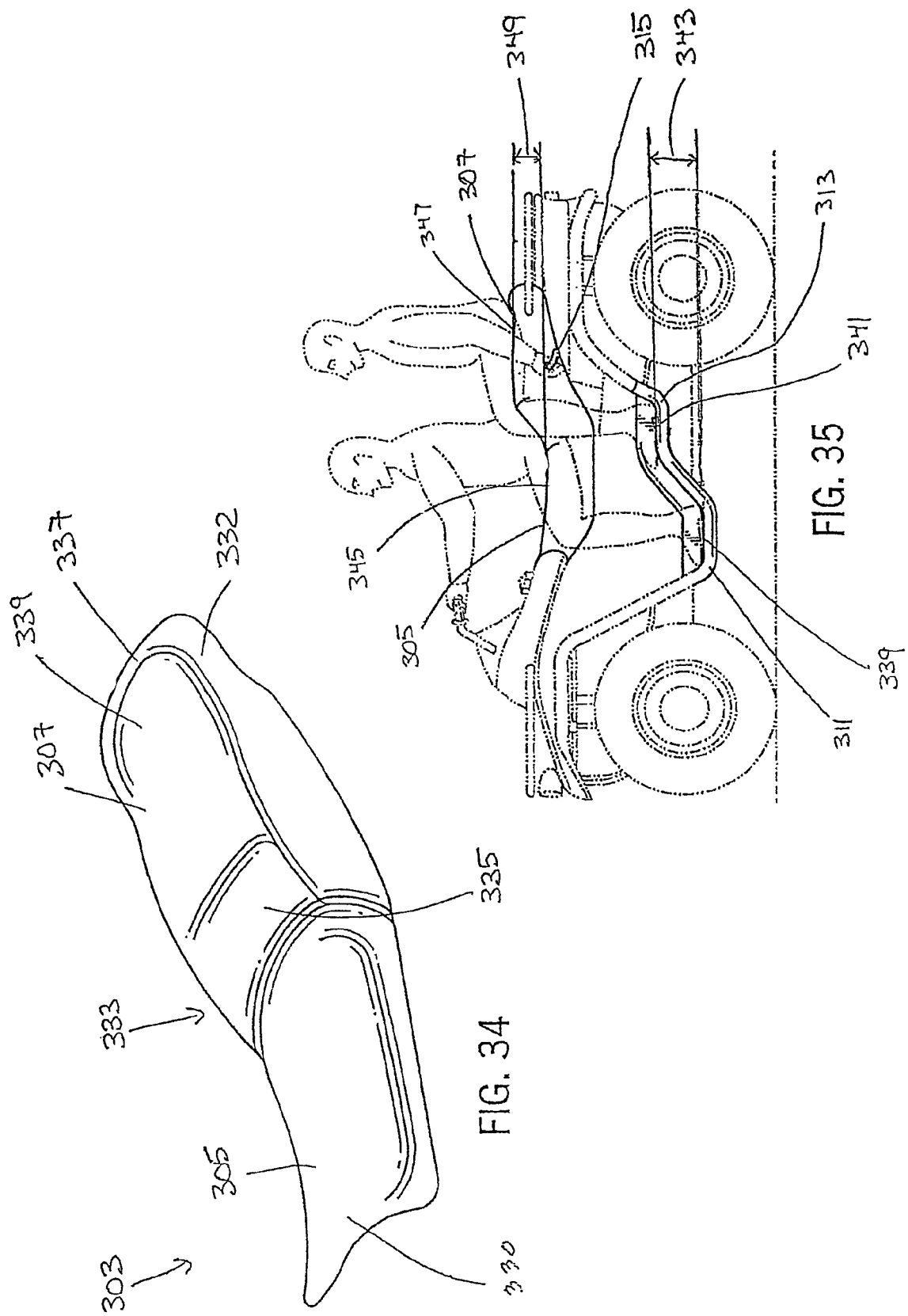

TWO PERSON RUV WITH ERGONOMIC SEATING AND FEET PLACEMENT

CROSS REFERENCE TO RELATED APPLICATIONS

This application is a continuation of U.S. patent application Ser. No. 11/841,230, filed Aug. 20, 2007; now U.S. Pat. No. 7,506,714, issued Mar. 24, 2009, which is a continuation of U.S. patent application Ser. No. 10/735,091, filed Dec. 12, 2003, now U.S. Pat. No. 7,258,192, issued Aug. 21, 2007, which is a continuation-in-part of U.S. patent application. Ser. No. 09/717,508, filed Nov. 21, 2000, now U.S. Pat. No. 6,755,269, issued Jun. 29, 2004.

BACKGROUND AND SUMMARY

Parent Application

The parent invention of the noted '508 application relates to an all-terrain type of vehicle and particularly an improved type of all-terrain vehicle, which is thoughtfully designed to carry the operator and at least one passenger in tandem.

All-terrain vehicles (ATV) are growing in usage and popularity and are described by the American National Standards Institute Specification Number ANS1/SVIA 1-1990 as the following: "Any motorized off-highway vehicle 50 inches (1270 mm) or less in overall width, with an unladen dry weight of 600 lb. (275 kg) or less, designed to travel on four low-pressure tires, having a seat designed to be straddled by the operator and handlebars for steering control, and intended for use by a single operator and no passenger." Hence ATV's by definition are expressly designed for a single operator and no passenger.

Current ATV design art centers on sizing the machine's suspension, seating and general ergonomics around the performance envelope necessary for a single occupant. However, due to the mobility of these vehicles for off-road terrain, coupled with very high levels of utility, often there is a desire to carry more than just the operator to the destination. Transporting a passenger is expressly disallowed by the present ATV manufacturers. The high placement of the rider on a single place saddle seat challenged with the unpredictable surface conditions found in off-round terrain demand performance levels exceeding design limits.

In view of the foregoing, the object of the parent invention is to upgrade the live passenger load capability enabling a new class of vehicle to be created which is capable of safely transporting more than just the operator in off-highway conditions. This new class of vehicle will be called a recreation utility vehicle (RUV).

This upgrade required substantial invention due to the relatively high placement of the riders on the saddle type seat, the ratio of combined operator find passenger weight as compared to the vehicle weight, and the rough and varying type of terrain encountered in off-highway use. The combined weight of operator and passenger can exceed half the weight of the unladen vehicle. This, in combination with the required high ground clearance of this type of off-highway vehicle, and resulting high placement of the live load straddling the seat, required enlargements in wheel base and track as well as suspension upgrades specific for side rollover resistance, and dynamic roll suppression (DRS), to be described, in order to make the RUV suitable for off highway usage.

The RUV will be defined as: "Any motorized off-highway vehicle 36 inches or greater in track, 45 inches or greater in wheelbase, designed to travel on at least four low-pressure tires, having a seat designed to be straddled by the operator and at least one passenger, and having handlebar-type steering control."

BRIEF SUMMARY OF THE INVENTION

Present Application

The present invention arose during continuing development efforts related to the noted parent invention. The present invention provides enhanced ergonomic seating and feet placement in a two person RUV.

BRIEF DESCRIPTION OF THE DRAWINGS

Parent Application

FIG. 6 is a perspective view of an alternate embodiment of a portion of FIG. 3.

FIG. 7 is a perspective view of a portion of FIG. 3.

FIG. 8 is like FIG. 7 and shows another embodiment.

FIG. 18 is like FIG. 16 and shows another embodiment.

FIG. 19 is like FIG. 16 and shows another embodiment.

FIG. 20 is an enlarged view of a portion of FIG. 16.

FIG. 21 is like FIG. 20 and shows another embodiment.

Present Disclosure

Figure 29:
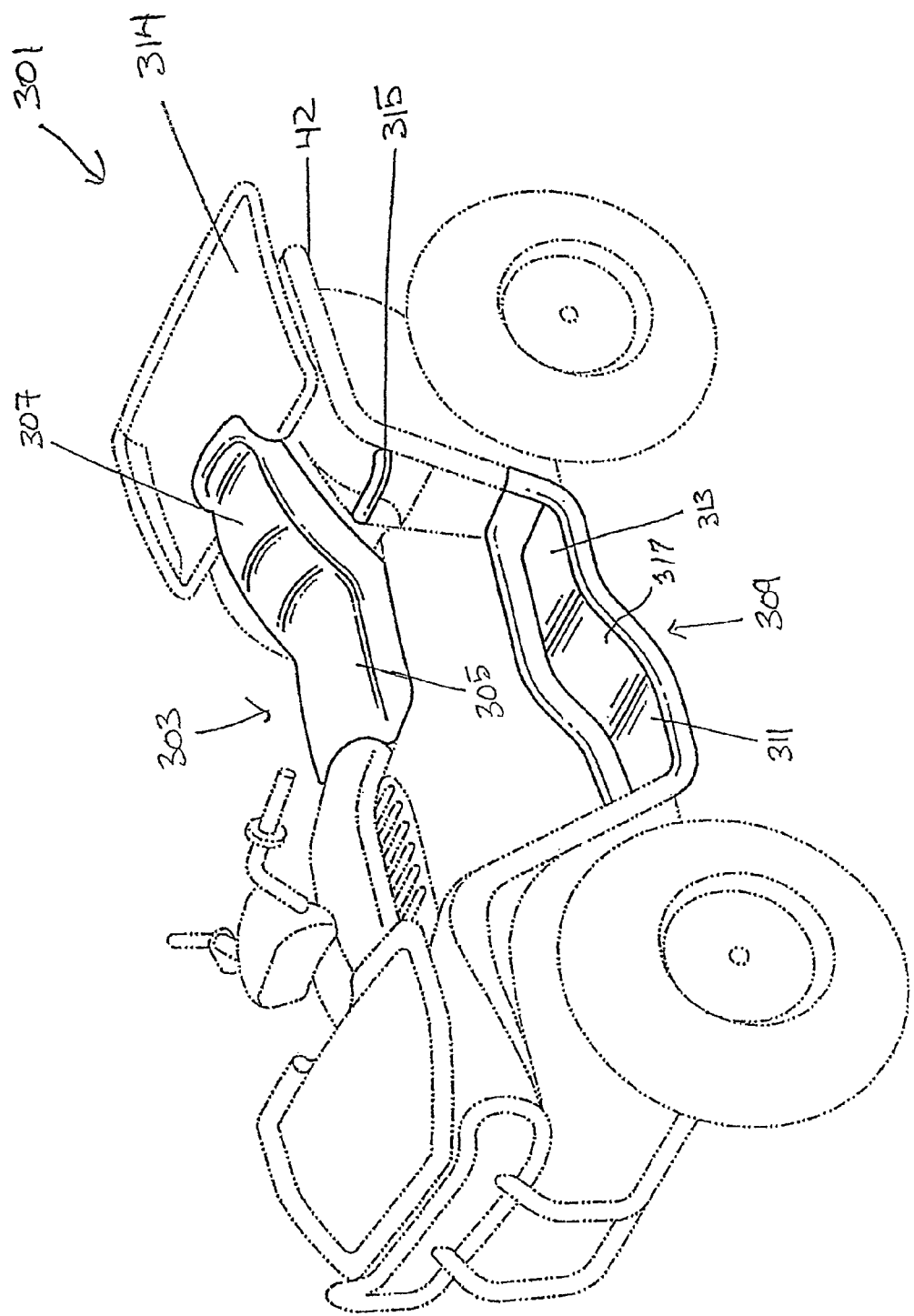

FIG. 29 is a perspective view of the RUV having an elongated multi place multi-planar saddle seat assembly and a pair of elongated multi-place multi-planar foot board assemblies.

Figure 30:
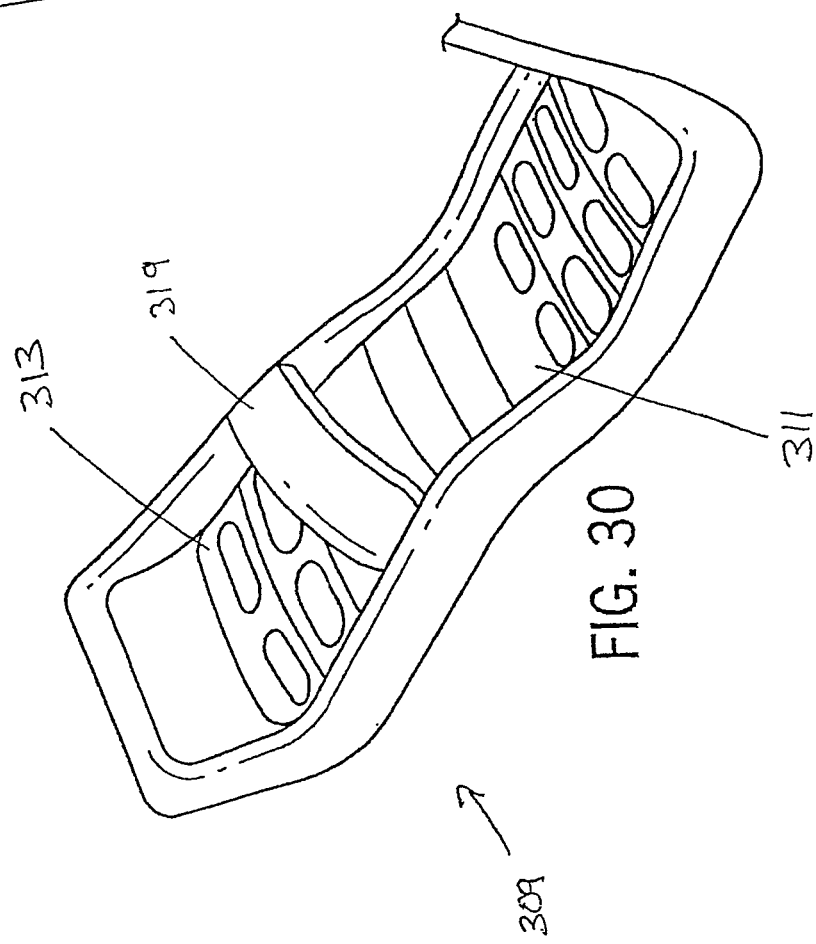

FIG. 30 is an enlarged view of an elongated multi-place multi-planar foot board assembly having a pocket for locating the toes of the passenger's foot.

Figure 31:
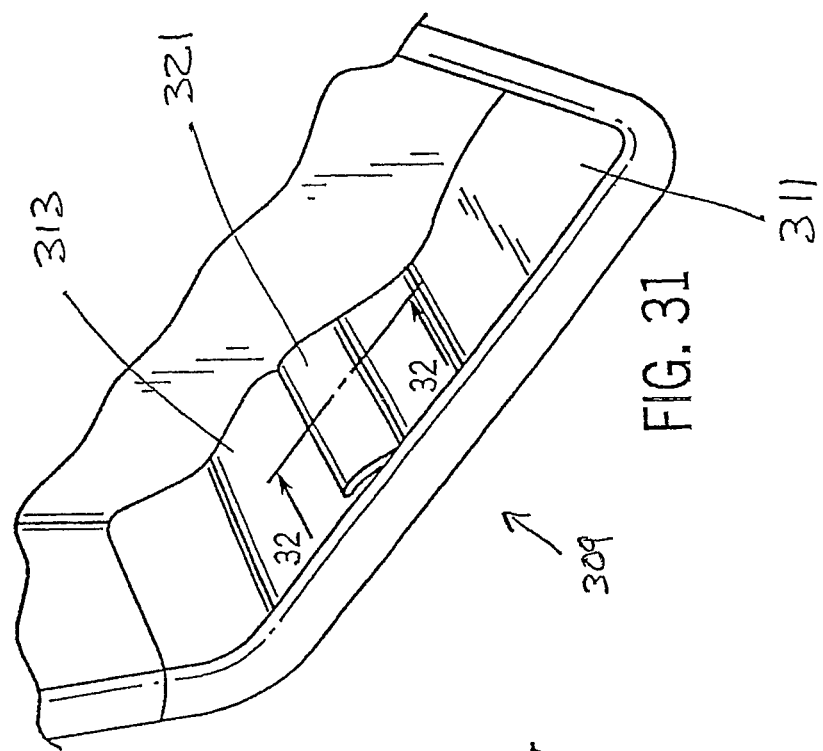

FIG. 31 is an enlarged view of an elongated multi-place multi-planar foot board assembly having a toe support for locating the toes of the passenger's foot.

Figure 32:
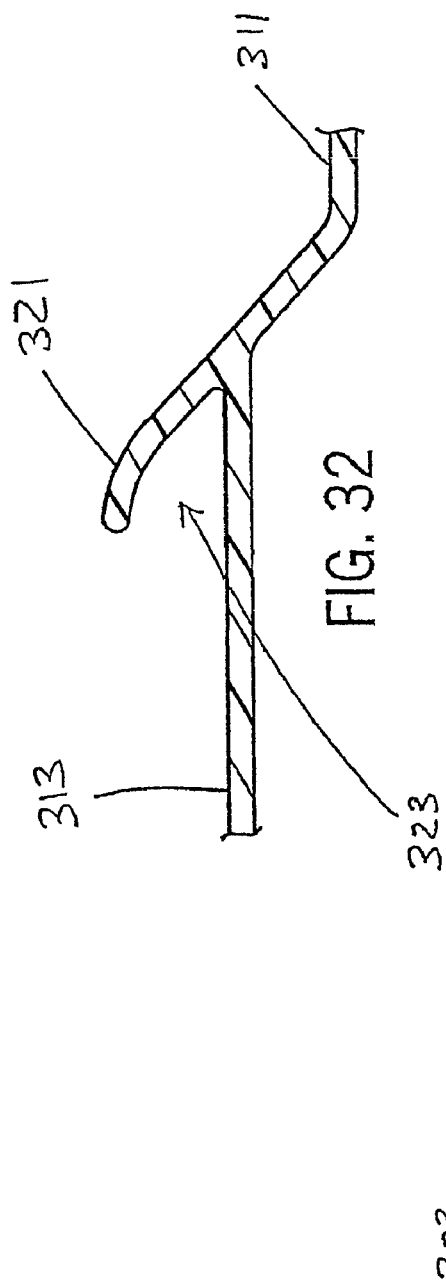

FIG. 32 is a sectional side view of the toe support shown in FIG. 31.

Figure 33:
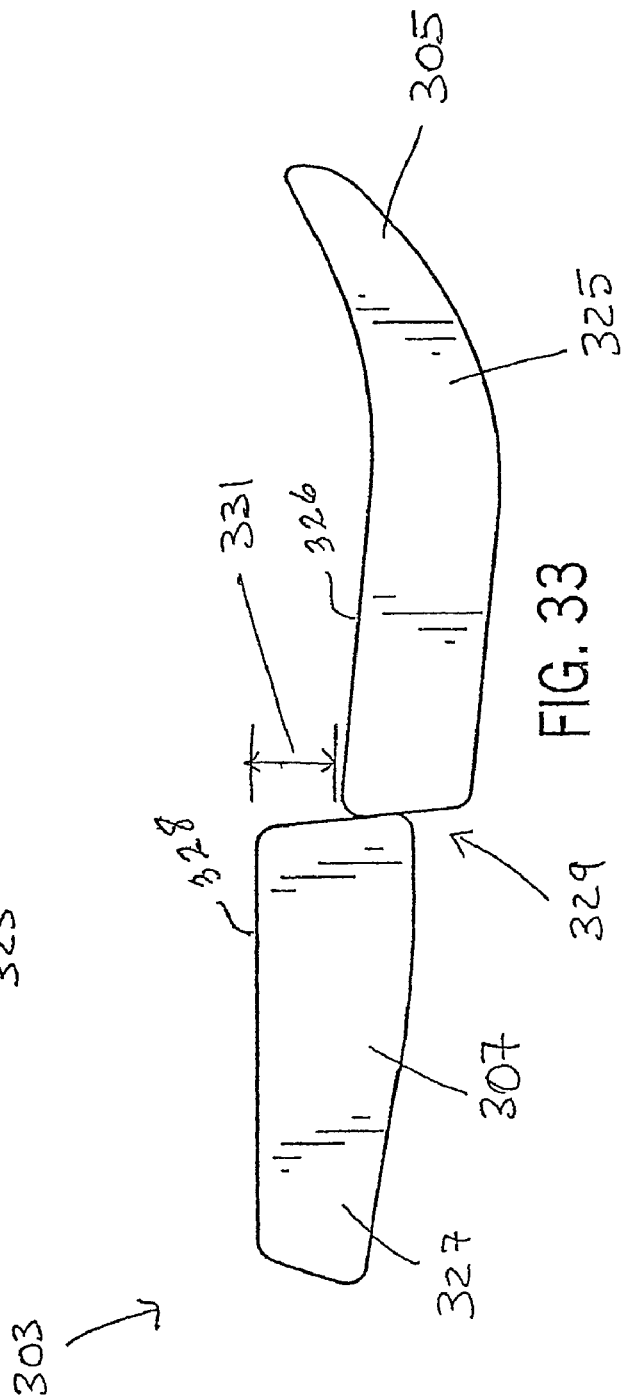

FIG. 33 is a side view of an elongated multi-place multi-planar saddle seat assembly having first and second different members providing first and second sections, separated by a step change.

FIG. 34 is a detailed perspective view of another embodiment of the elongated multi-place multi-planar saddle seat assembly having first and second different members providing first and second sections, respectively.

FIG. 35 is a side elevation view of the RUV of the present invention and depicting eon-elation between the planes of the multi-place multi-planar saddle seat assembly and the planes of the multi-place multi-planar foot board.

DETAILED DESCRIPTION OF THE INVENTION

Parent Application

Figure 1:
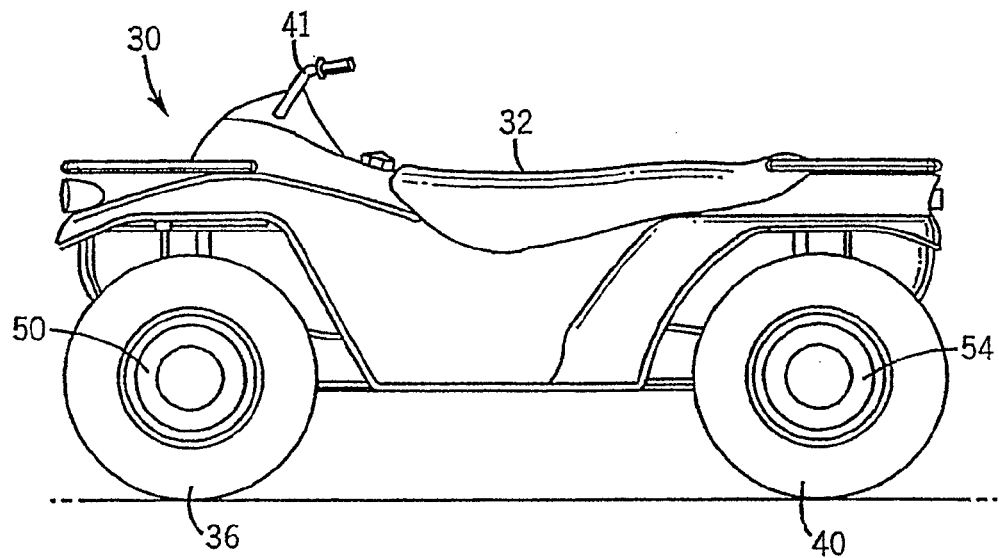
FIG. 1 is a side elevation view of an RUV constructed in accordance with the parent invention.
Figure 2:
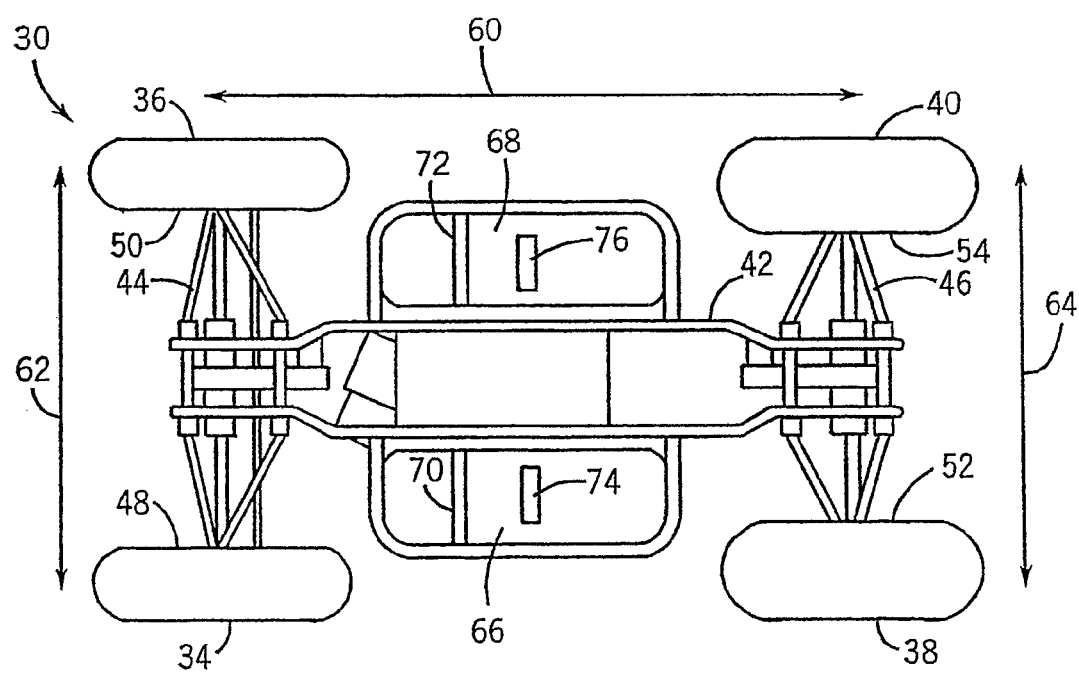
FIG. 2 is a bottom elevation view of the RUV of FIG. 1.
Figure 3:
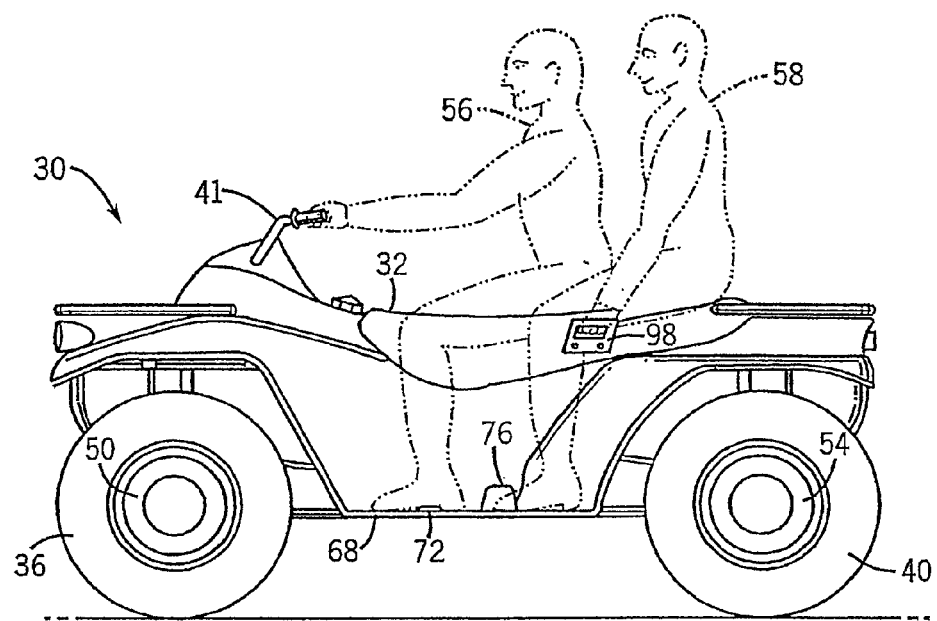
FIG. 3 is a view like FIG. 1 and shows two riders in tandem.

FIGS. 1-3 show an RUV (Recreational Utility Vehicle), suitable for on-road and off-road multi-terrain use. RUV 30 has a saddle seat 32 and at least four low pressure tires 34, 36, 38, 40, designed to operate at ten psi, pounds per square inch, or less. The front tires are steered by handlebar 41. RUV 30 has a suitably elongated frame 42 having front and rear suspensions 44 and 46 spaced longitudinally therealong and respectively mounting a front pair of laterally spaced wheels 48 and 50, FIGS. 2, 15, and a rear pair of laterally spaced wheels 52 and 54. Saddle seat 32 on frame 42 is sufficiently longitudinally elongated to safely accommodate at least two riders in tandem, as shown in dashed line in FIG. 3 at operator driver 56 and passenger 58, in combination with frame 42 being sufficiently longitudinally elongated to safely accommodate elongated saddle seat 32 and the two riders in tandem, in combination with the front and rear pair of wheels being sufficiently spaced apart by a wheelbase 60 sufficiently longitudinally elongated to safely accommodate elongated frame 42 and elongated saddle seat 32 and the two riders in tandem, in combination with the noted front and/or rear suspensions being provided with dynamic roll suppression to safely accommodate elongated wheelbase 60 and elongated frame 42 and elongated saddle seat 32 and the two riders in tandem, all as to be described. Wheelbase 60 is sufficiently longitudinally elongated to increase resistance to end-over-end rollover when traveling uphill or downhill otherwise caused by the higher center of gravity and the increased mass thereat due to a second rider 58. It is preferred that the wheelbase be at least 45 inches. It is also preferred that the wheelbase be sufficiently longitudinally extended aft to increase the moment arm from the center of gravity to the rear wheels relative to the front wheels to reduce forward weight transfer during braking to provide safer stopping with two riders. The front pair of wheels and the rear pair of wheels are each laterally spaced apart by a track 62 and 64, respectively, sufficiently laterally widened to increase resistance to side rollover during cornering or on a sidehill otherwise caused by the higher center of gravity and the increased mass thereat due to second rider 58. It is preferred that each track 62 and 64 be at least 36 inches measured at the wheel centerline.

A pair of right and left elongated foot boards 66 and 68 are provided on frame 42 and have a first pair of foot rests 70 and 72, FIGS. 2, 3, 7, on opposite sides of saddle seat 32 and positioning the feet of driver 56 straddling saddle seat 32, and a second pair of foot rests 74 and 76 on opposite sides of saddle seat 32 and aft of first pair of foot rests 70 and 72, respectively, and positioning the feet of passenger 58 aft of the feet of driver 56 and out of the way of the driver in operating the vehicle and also positioning passenger 58 straddling saddle seat 32 aft of the driver and locating the mass of passenger 58 for proper vehicle operation during weight transfer maneuvers including braking, accelerating, cornering, and travel over rough terrain. First pair of foot rests 70 and 72 extend under the driver's feet, and second pair of foot rests 74 and 76 extend over the passenger's toes. First pair of foot rests 70 and 72 are provided by a pair of raised ribs, each locating the arch of the driver's foot. Second pair of foot rests 74 and 76 are provided by a pair of pockets, each locating the toes of the passenger's foot. Ribs 70 and 72 extend laterally. Pockets 74 and 76 extend laterally and each defines a longitudinally extending tunnel thereunder, as shown at tunnel 78 in FIG. 7, into which the toes of the passenger are inserted. The heel of the driver's foot is in-between rib 72 and pocket 76. In another embodiment. FIG. 8, each of the first pair of foot rests is provided by an upwardly extending heel support 80 locating the back of the heel of the driver, and each of the second pair of foot rests is provided by a toe support 82 extending rearwardly from heel support 80 and locating the toes of the passenger. Toe supports 82 extend above the toes of the passenger.

Figure 5:
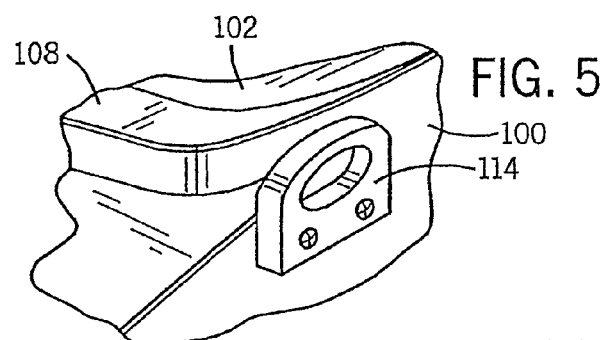
FIG. 5 is an enlarged view of a portion of FIG. 4.
Figure 4:
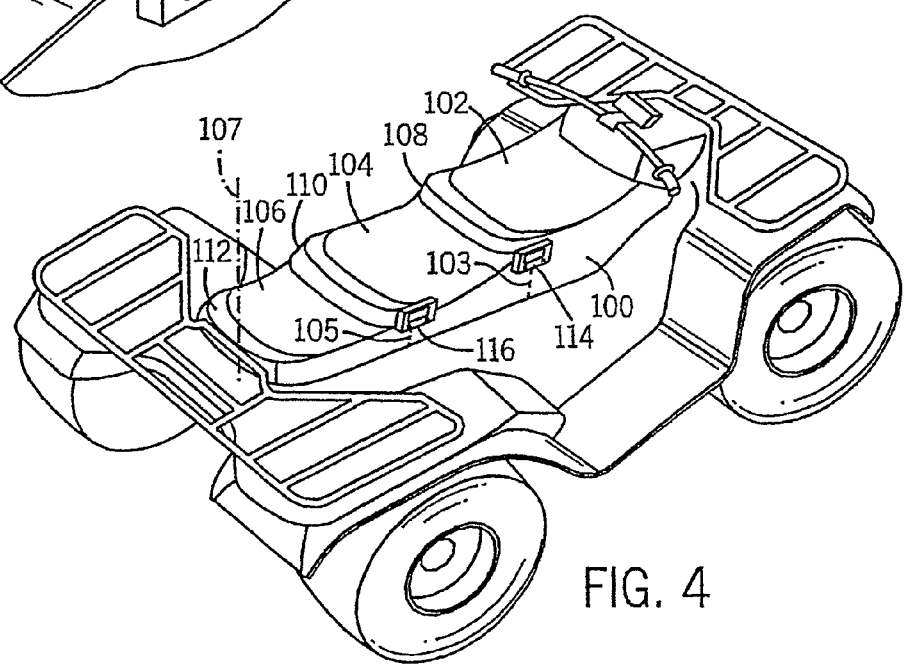
FIG. 4 is a perspective view of a further embodiment for a three rider RUV.

In preferred form, seat 32 is provided by a double saddle seat 84, FIG. 6, having a pair of saddles 86 and 88 in tandem. Seat 84 is multi-level, with saddles 86 and 88 at different levels, preferably with saddle 88 being higher than saddle 86. A raised shoulder or seatback 90 extends upwardly from the seat and provides a divider between saddles 86 and 88 locating the rump of driver 56, and also locating the legs of passenger 58 straddled on each side thereof. The divider includes a cutout 92 providing an upper handle 94 for gripping by passenger 58. A second raised shoulder 96 extends upwardly from the seat behind rearmost saddle 88 and locates the rump of passenger 58. Additional or alternative grip handles such as 98, FIG. 3, may be provided on laterally opposite sides of the seat for gripping by passenger 58. In a further embodiment, FIG. 4, the seat is provided by a triple saddle seat 100 having three saddles 102, 104, 106, having respective raised shoulders 108, 110, 112, providing respective dividers and rump locators, and which also may be provided with grip handles such as 114, 116, FIGS. 4, 5. Saddles 102, 104, 106 respectively seat driver 56, passenger 58, and a second passenger schematically partially shown in broken line at 107, in a further embodiment, multi-place saddle seat 84 may be provided by two single seats in tandem, as schematically illustrated at dashed break line 87 in FIG. 6. In a further embodiment, multi-place seat 100 may be provided by three single seats in tandem, as schematically illustrated at dashed break lines 103, 105 in FIG. 4.

Figure 9:
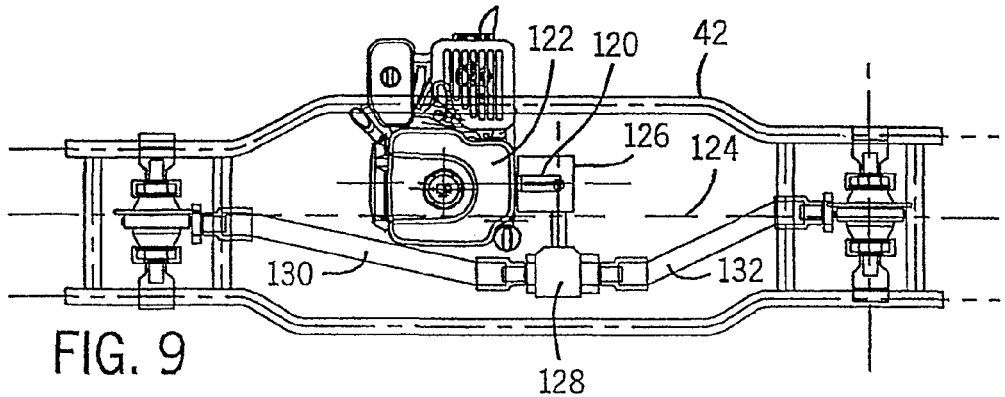
FIG. 9 is a top elevation view of the drive train in one form of the parent invention.
Figure 10:
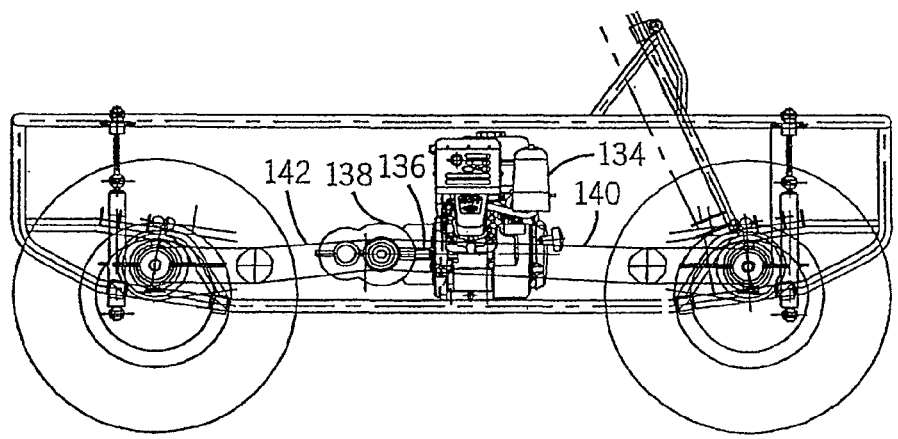
FIG. 10 is a side elevation view of the drive train of another form of the parent invention.
Figure 11:
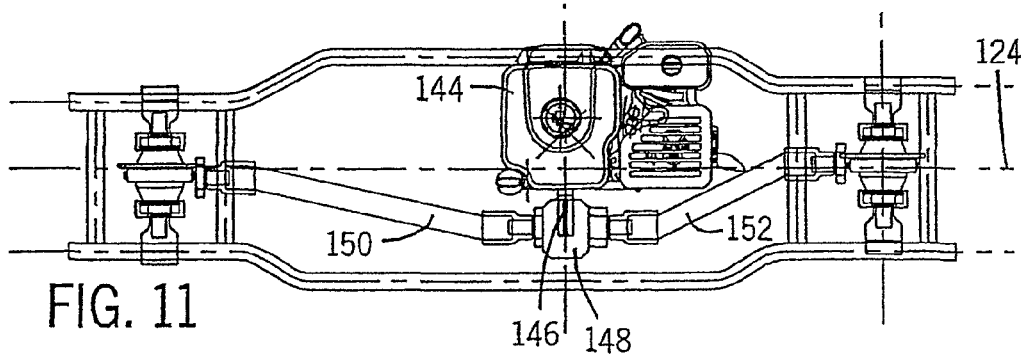
FIG. 11 is like FIG. 9 and shows another embodiment.
Figure 12:
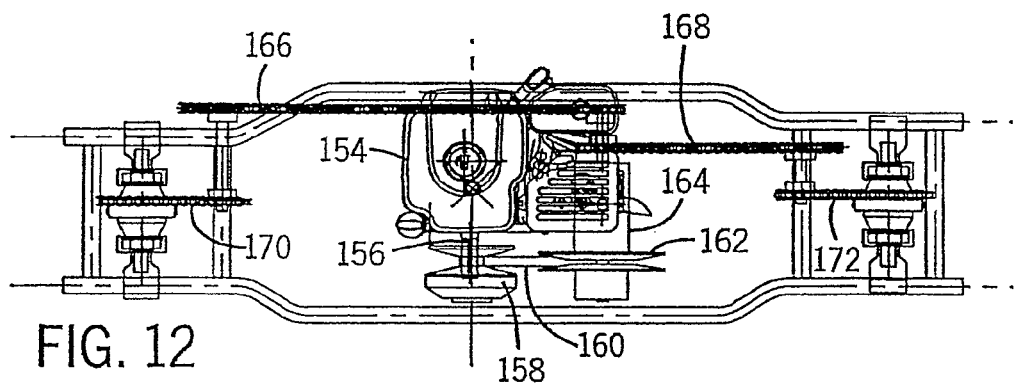
FIG. 12 is like FIG. 9 and shows another embodiment.
Figure 14:
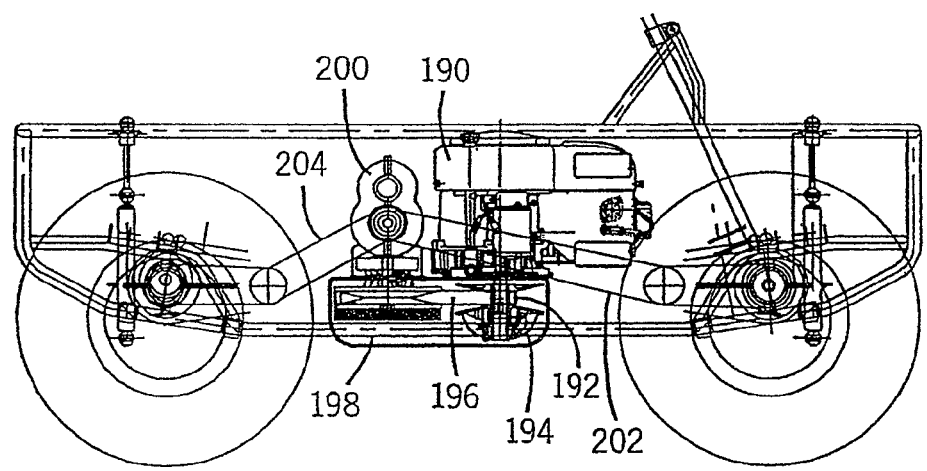
FIG. 14 is like FIG. 10 and shows another embodiment.
Figure 13:
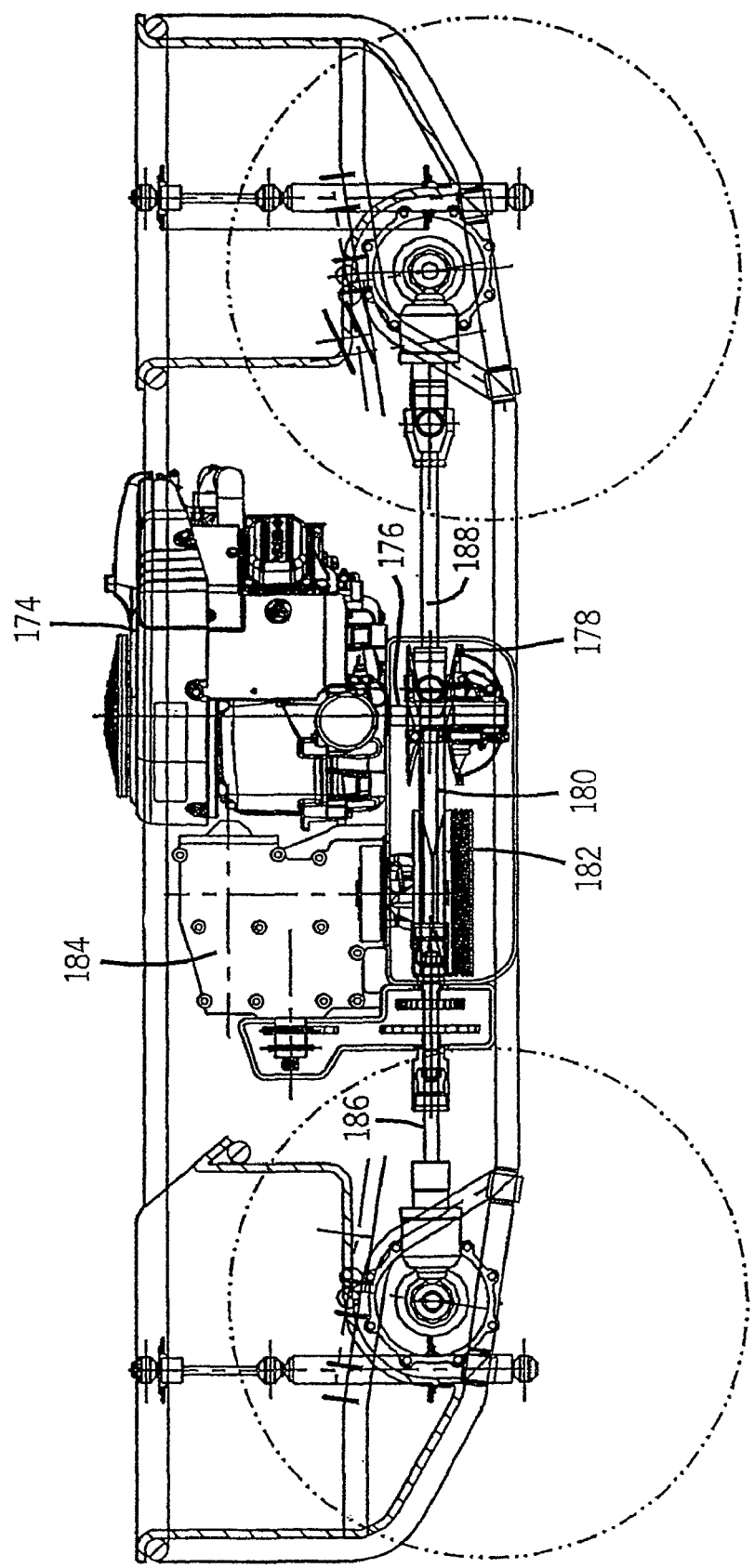
FIG. 13 is like FIG. 10 and shows another embodiment.
Figure 15:
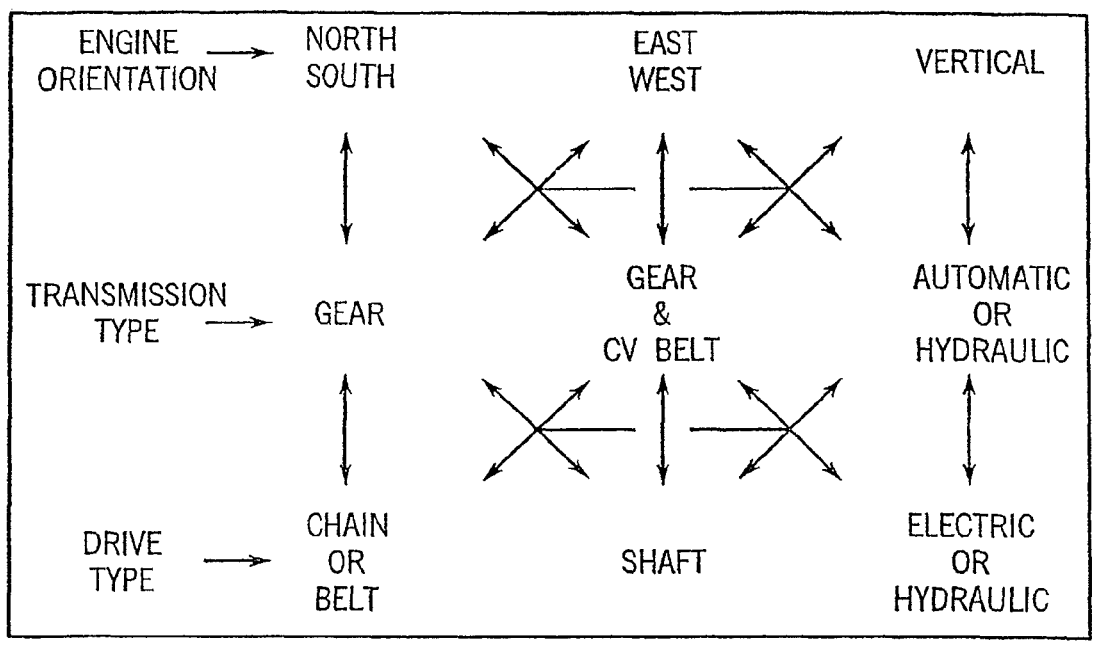
FIG. 15 is a schematic chart showing an RUV drivetrain matrix.

The invention may be used in various engine and gear train orientations, including north-south arrangements and east-west arrangements, and also in vertical arrangements such as in commonly owned co-pending U.S. application Ser. No. 09/217,264, filed Dec. 21, 1998, now U.S. Pat. No. 6,343,669. FIG. 9 shows a north-south arrangement with shaft drive, namely an arrangement wherein output shaft 120 of internal combustion engine 122 extends horizontally longitudinally parallel to longitudinal axis 124, also known as north-south. Output shaft 120 is connected through power take-off 126 to transmission 128 and drive shafts 130 and 132 to drive the front and rear wheels. FIG. 10 shows a north-south arrangement with chain drive, namely engine 134 having horizontally longitudinally extending output shaft 136 driving transmission 138 which drives a chain drive having chains 140 and 142 driving the front and rear wheels. FIG. 11 shows an east-west arrangement with shaft drive, namely wherein engine 144 has an output shaft 146 extending horizontally laterally, also known as east-west, relative to longitudinal axis 124. Output shaft 146 drives transmission 148 which drives driveshafts 150 and 152 which drive the front and rear wheels, FIG. 12 shows an east-west arrangement with chain drive, namely with engine 154 having horizontally laterally extending output shaft 156 driving power take-off pulley 158 which drives belt 160 to drive pulley 162 driving transmission 164 which drives chains 166, 168, 170, 172 to drive the front and rear wheels. FIG. 13 shows a vertical arrangement with shaft drive, namely with engine 174 having vertically extending output shaft 176 driving power take-off pulley 178 which drives belt 180 driving pulley 182 which drives transmission 184 driving driveshafts 186 and 188 driving the front and rear wheels. FIG. 14 shows a vertical arrangement chain drive, namely with engine 190 having vertically extending output shaft 192 driving power take-off pulley 194 driving belt 196 driving pulley 198 driving transmission 200 driving chains 202 and 204 driving the front and rear wheels. Various types of transmissions may be used, including a multiple speed gear transmission, a constant velocity transmission in conjunction with a gear-reducing transmission, an automatic transmission, and a hydraulic transmission. Power from the output shaft of the engine is transferred to at least one wheel, and preferably to all four wheels. Drivetrain matrix options are shown in FIG. 15 for the various engine orientations, transmission types, and drive types. Each of the north-south, east-west and vertical engine orientations may be selectively used with each of the gear, gear and cv (constant velocity) belt, and automatic, or hydraulic transmission types which in turn may be used with each of the chain or belt, shaft, and electric or hydraulic drive types.

Figure 16:
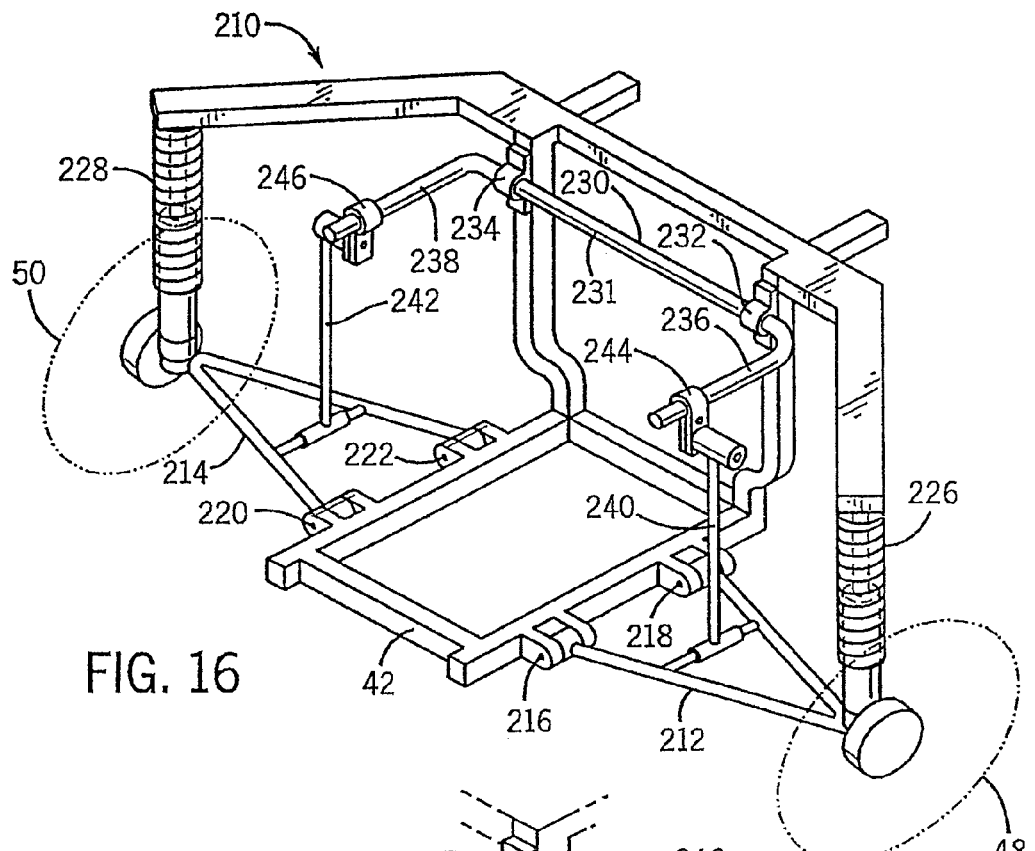
FIG. 16 is a perspective view of a suspension system for an RUV in accordance with the parent invention.
Figure 17:
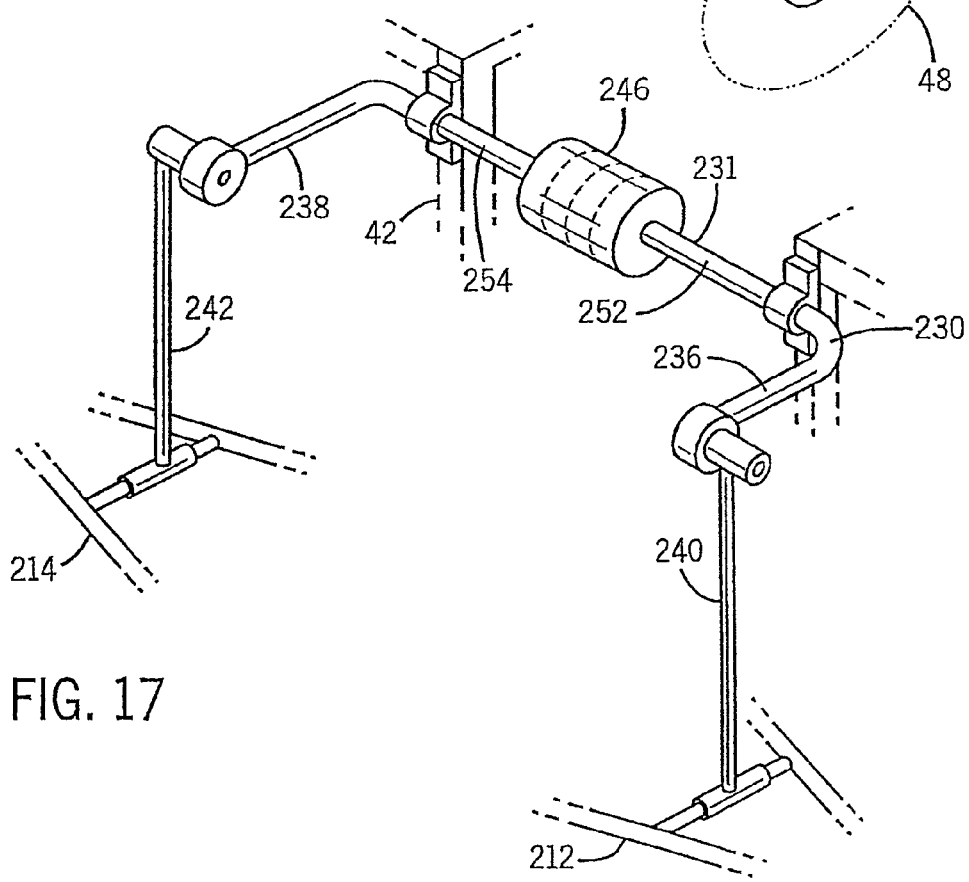
FIG. 17 is like FIG. 16 and shows another embodiment.

FIG. 16 shows a suspension system 210 for one or both of the suspensions 44 and 46 for the sets of front and rear wheels. Right and left suspension arms 212 and 214, preferably A-arms, connect respective wheels 48 and 50 to the frame. The inner ends of suspension arms 212 and 214 are pivotally mounted to the frame at respective pivot pins 216, 218, 220, 222, and the outer ends of the suspension arms are connected to the respective wheels and to respective spring and shock absorber assemblies 226 and 228 having their upper ends mounted to the frame, all as is known. A torsionally and twistable anti-roll bar 230 is mounted to the frame at clips 232 and 234 and has right and left longitudinally extending arm segments 236 and 238 connected through respective links 240 and 242 to respective suspension arms 212 and 214. Adjustments clips 244 and 246, FIGS. 16, 20, allow slidably adjustable mounting of the links 240 and 242 along respective arm segments 236 and 238 to adjust the relative location and mounting position of links 240 and 242. Alternatively, the link may be mounted to a knuckle such as 237, FIG. 21, at the end of the anti-roll bar arm segment, without adjustment. In operation, if left tire 36 and left wheel 50 encounter a bump 244, FIGS. 22, 23, left suspension arm 214 moves upwardly which in turn moves link 242, FIG. 16, upwardly which in turn moves arm segment 238 upwardly which in turn torsionally twists anti-roll bar 230 along its lateral segment 231; however, such torsional twisting is resisted by arm segment 236 connected to link 240 connected to suspension arm 212 because tire 34 and wheel 48 have not encountered such bump, and hence the upward movement of wheel 50 is resisted, all as is known and standard in anti-roll bar applications. The resistance to torsional twisting provided by the anti-roll bar also provides flatter cornering, as is known. The anti-roll bar also reduces vehicle pitch and side roll on a sidehill, as is known.

In the parent invention, a dynamic roll suppression assembly is provided dynamically resisting side roll of the vehicle, including when encountering a bump, during cornering and on a sidehill, otherwise caused by the higher center of gravity and increased mass thereat due to second rider 58. The dynamic roll suppression assembly provides a variable resistance to side roll. The dynamic roll suppression assembly variably increases resistance to side roll according to displacement of the suspension, and preferably also according to the rate of displacement of the suspension.

The noted dynamic roll suppression assembly includes one or more lost motion links such as 246, FIG. 17, 248, FIG. 18, and 248 and 250, FIG. 19. Lost motion link 246 is a resilient damping member interposed along lateral segment 231 of anti-roll bar 230 between right and left segments 252 and 254 thereof, and permits, for example, greater rotational twisting of right segment 252 than left segment 254, and vice versa, and provides damping therebetween. In FIG. 18, left link 242 is replaced by lost motion link 248. In FIG. 19, right and left links 240 and 242 are replaced by lost motion links 250 and 248, respectively. The lost motion Sinks each apply a torsional twisting force to anti-roll bar 230 as a function of the rate of displacement of the respective suspension arm 212, 214. The faster the rate of displacement of the suspension arm the greater the amount of torsional twisting force applied to the anti-roll bar and the greater the resistance to side roll provided by the dynamic roll suppression assembly. The slower rate of displacement of the suspension arm the lower the amount of torsional twisting force applied to the anti-roll bar and the lesser the resistance to side roll provided by the dynamic roll suppression assembly. Each lost motion link provides variable lost motion displacement travel between the respective suspension arm and the anti-roll bar, the faster the rate of displacement the less such lost motion displacement travel.

As noted, the faster the rate of displacement of the suspension arm the greater the amount of torsional twisting force applied to the anti-roll bar and the greater the resistance to side roll provided by the dynamic roll suppression assembly such that the dynamic roll suppression assembly provides an increasing restoration moment with increasing velocity of suspension travel. It is preferred that the restoration moment be increased with increasing velocity of suspension travel, until a threshold velocity is reached, whereupon the restoration moment is immediately decreased, to be described. Lost motion link 246 is a resilient rubber or polymeric member having right and left anti-roll bar segments 252 and 254 non-rotationally secured to distally opposite ends thereof and exhibiting increasing resistance to torsional twisting the faster the rate of angular movement of right segment 252 and/or left segment 254 applied thereto. Lost motion links 248 and 250 are each provided by a spring and shock absorber assembly including a compression spring 260, FIG. 18, and a dampening shock absorber having a cylinder. 262 and a reciprocal plunger 264, the cylinder being connected to the suspension arm, and the plunger being connected to the anti-roll bar, or vice versa. Centering coil spring 260 is provided around the shock absorber and is balanced to provide self-centering of the frame on the suspension.

Figure 22:
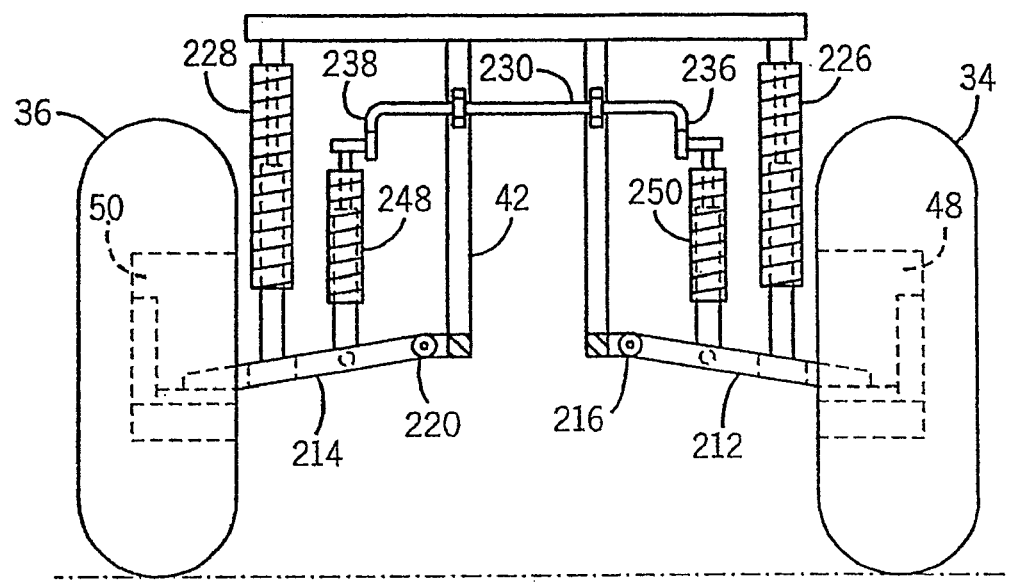
FIG. 22 is an end elevation view of the suspension system of FIGS. 16 and 19.
Figure 23:
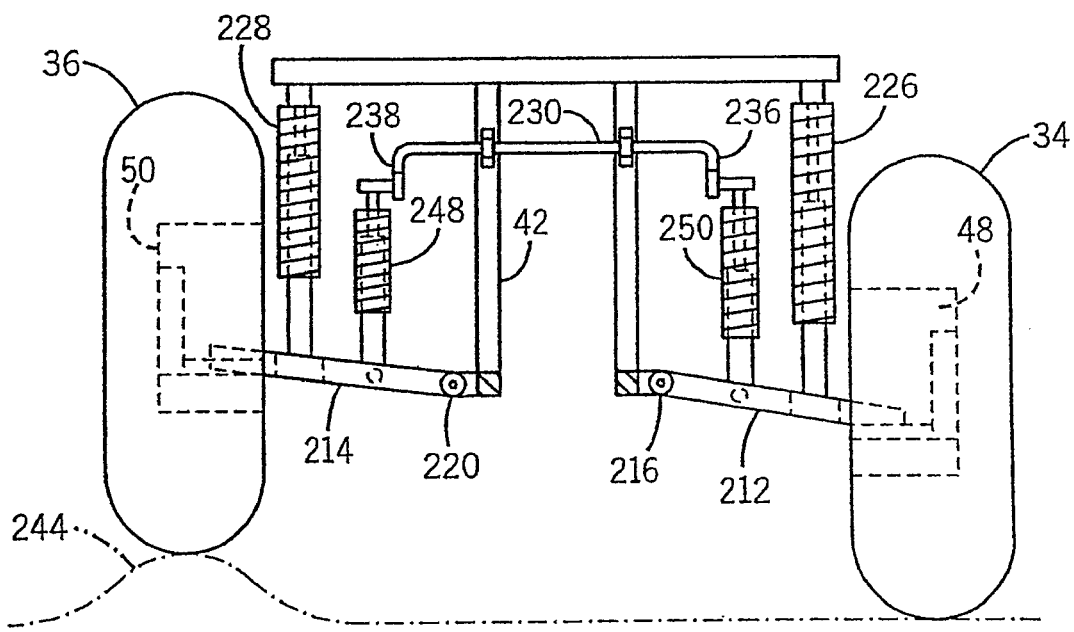
FIG. 23 is like FIG. 22 and illustrates operation of the suspension system.
Figure 26:
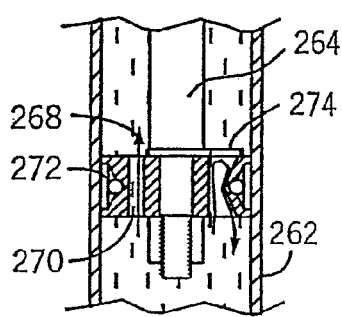
FIG. 26 is an enlarged view of a portion of FIG. 25.
Figure 25:
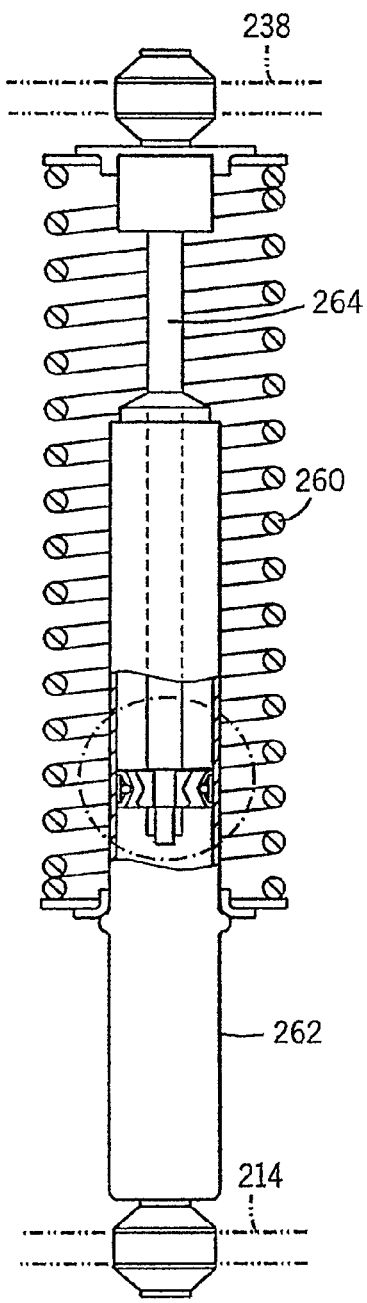
FIG. 25 is like FIG. 24 and illustrates operation.
Figure 24:
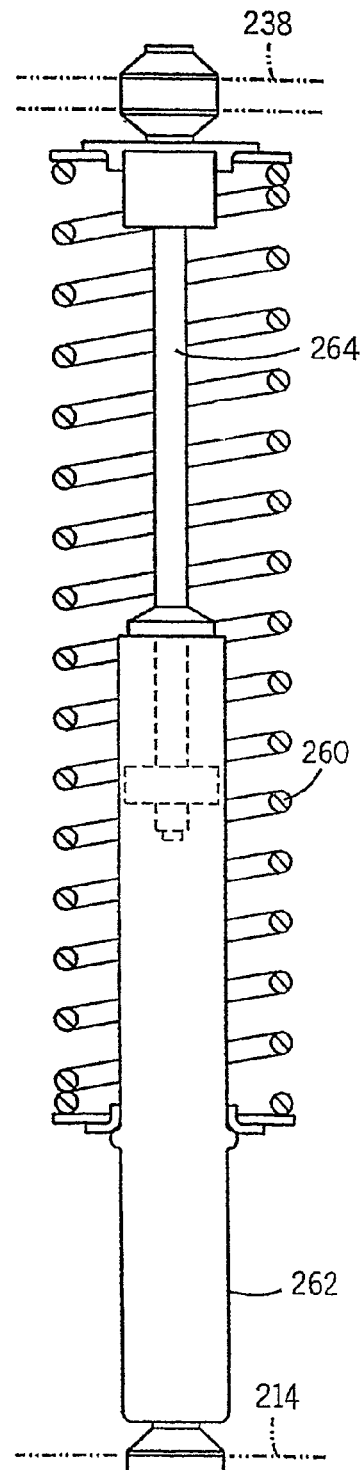
FIG. 24 is a side view partially in section of a portion of the suspension system of FIG. 19.

Referring to FIGS. 22 and 23, when a bump 244 is encountered, left tire 36 and left wheel 50 move upwardly, and cylinder 262 slides upwardly along plunger 264 from the position shown in FIG. 24 to the position shown in FIG. 25, thus providing the noted lost motion. As cylinder 262 moves upwardly, and plunger 264 thus moves relatively downwardly therein, hydraulic fluid moves upwardly as shown at arrow 268, in FIG. 26 through passage 270 at lower end seal 272 of plunger 264. The slower the rate of upward displacement of cylinder 262, the lower the resistance to such movement by flow 268 of hydraulic fluid through passage 270. The faster the rate of upward displacement of cylinder 262, the greater the resistance to such movement because only so much hydraulic fluid can flow through passage 270. Hence, the faster the rate of displacement of suspension arm 214 the greater the amount of torsional twisting force applied to anti-roll bar 230 and the greater the resistance to side roll provided by the dynamic roll suppression assembly such that the dynamic suppression roll assembly provides an increasing restoration movement with increasing velocity of suspension travel.

Figure 27:
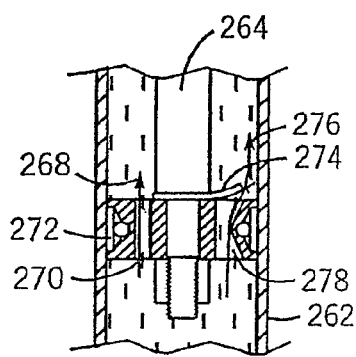
FIG. 27 is like FIG. 26 and illustrates operation.
Figure 28:
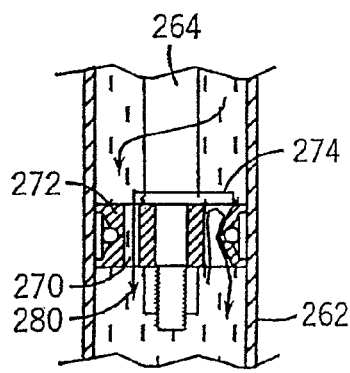
FIG. 28 is like FIGS. 26 and 27 and illustrates further operation.

It is preferred that this increasing restoration moment with increasing velocity of suspension travel be applied until a threshold of velocity is reached, whereupon the restoration movement is immediately decreased. The shock absorber has a valve 274, FIG. 27, enabling immediate release and decrease of the restoration moment when the suspension velocity reaches the noted threshold indicating impact loading, i.e., a sudden bump 244 which may otherwise cause side rollover due to the noted higher center of gravity and increased mass thereat due to second rider 58. Upon reaching the noted threshold velocity of suspension travel, i.e. cylinder 262 is attempting to move upwardly at a fast enough rate to apply enough hydraulic fluid force corresponding to such threshold, valve 274 opens in response to such force allowing flow of additional hydraulic fluid as shown at arrow 276 through passage 278, to immediately release and decrease resistance to upward movement of cylinder 262 and suspension arm 214, to thus provide a soft ride at left wheel 50 and quickly absorb lost motion of cylinder 262 along plunger 264 without applying anti-roll torsional twisting to anti-roll bar 230, which in turn allows tire 36 and wheel 50 to rapidly move upwardly without applying severe side roll to the RUV. Return movement of cylinder 262 downwardly along plunger 264 is damped as valve 274 closes and hydraulic fluid can only flow downwardly through passage 270 as shown at arrow 280. FIG. 28.

The dynamic roll suppression assembly provides dynamic roll compensation by supplying a restoration moment to counter increased roll moments due to the live load of the RUV having at least two riders 56, 58 and the higher center of gravity thereof. The restoration moment is varied according to the velocity of suspension travel. The dynamic roll suppression assembly provides a lower restoration moment at lower velocity of suspension travel relative to the frame to provide a soft anti-roll rate for a comfortable low speed ride. The dynamic roll suppression assembly provides a higher restoration moment at higher velocities of suspension travel relative to the frame to provide a stronger anti-roll rate and higher roll stiffness for stability at higher speeds. The RUV is thus suitable for off-road use where a softer ride on rough terrain and sidehills is desirable, yet is also suitable for on-road use where a stronger anti-roll rate and higher roll stiffness are desired for stability at higher speeds including cornering. As noted, it is preferred that the restoration moment increase with increasing velocity of suspension travel relative to the frame until a threshold suspension travel velocity is reached indicating impact loading, whereupon the dynamic roll suppression assembly immediately releases and reduces the restoration moment.

Present Disclosure

Referring to FIG. 29, in an additional embodiment, the RUV 301 includes a multi-place multi-planar saddle seat assembly 303 which is elongated and designed, to accommodate at least two riders in tandem, namely the operator driver 56 and passenger 58, described above. The multi-place multi-planar saddle seat assembly 303 has a first section 305 existing in a first longitudinal plane and a second, section 307 existing in a second longitudinal plane located higher than the first longitudinal plane. The first section 305 seats the driver 56. The second section 307 is aft of the first section 305 and seats the passenger 58.

The RUV 301 also has a pair of multi-place multi-planar foot board assemblies 309 attached to the frame 42 on laterally opposite sides of the multi-place multi-planar saddle seat assembly 303. Each of the multi-place multi-planar foot board assemblies 309 have a first foot rest 311 positioning the foot of the driver 56, and a second foot rest 313 positioning the foot of the passenger 58. The second foot rest 313 is aft of the first foot rest 311. The first foot rest 311 exists in a first longitudinal plane, and the second foot rest 313 exists in a second longitudinal plane higher than the first longitudinal plane.

As shown in FIG. 29, the RUV 301 also includes grip handles 315, which are disposed on laterally opposite sides of the multi-place multi-planar saddle seat assembly 303. The grip handles 315 are for gripping by the passenger 58 during travel of the RUV 301. Although in FIG. 29, the grip handles 315 are shown mounted to the frame 42, the grip handles 315 may also be mounted to the multi-place multi-planar saddle seat assembly 309, as shown in FIGS. 3-6, or to the rack assembly 314. In the embodiment shown in FIG. 29, it is preferred that the grip handles 315 are laterally spaced from the multi-place multi-planar saddle seat assembly 309 to maximize the riding comfort and stability of passenger 58.

Referring to FIG. 29, the first pair of foot rests 311 and the second pair of foot rests 313 of the multi-place foot board assemblies 309 are at different levels. More specifically, the first pair of foot rests 311 position the feet of the driver 56, and the second pair of foot rests 313 are aft of and higher than the first pair of foot rests 311 and position the feet of the passenger 58. In the embodiment shown, each of the multi-place multi-planar foot board assemblies 309 is a single unitary member having a transition portion 317 extending upwardly and rearwardly from the respective first foot rest 311 to the respective second foot rest 313.

Referring to FIG. 30, each multi-place foot board assembly 309 may include a pocket 319 for locating the toes of the passenger's foot. In addition, referring to FIG. 31, each multi-place foot board assembly 309 may include a toe support 321 extending rearwardly and locating the toes of the passenger 58. Referring to FIG. 32, the toe support 321 extends upwardly and rearwardly and provides a channel 323 wherein the toes of the passenger 58 are placed during RUV travel. It is also recognized that either or both of the first pair of foot rests 311 or the second pair of foot rests 313 may include ribs (72, shown in FIG. 7) extending under and locating the heels of the driver and/or passenger, respectively.

Referring to FIG. 33, the saddle seat assembly 303 may alternately comprise a first member 325 and different second member 327, which respectively provide the first section 305 and second section 307 of the saddle seat assembly 303. In this particular construction, the first member 325 and the second member 327 face each other at an interface 329 which has a step change, as shown at 331, from a first level at 326 to a second higher level at 328.

Referring to FIG. 34, the elongated multi-place saddle seat assembly 303 may alternately comprise first and second members 330, 332 which interface at a transition portion 333 extending upwardly and rearwardly from the first section 305 to the second section 307. Preferably, the transition portion 333 has a recessed portion 335, which locates the rump of the driver 56 straddling the multi-place multi-planar saddle seat assembly 303. The second section 307 of the saddle seat assembly 303 may also include a raised shoulder 337 which extends upwardly from the second section 307 and locates the rump of the passenger 58 straddling the multi-place multi-planar saddle seat assembly 303. Preferably, the raised shoulder 337 has a recessed portion 339 for locating the rump of the passenger 58.

Referring to FIG. 35, it is recognized by the present invention that the different planes of the multi-place foot board assemblies 309 and the saddle seat assembly 303 preferably correlate to each other to maximize rider comfort and control during RUV operation. More specifically, the level 339 of the first pair of foot rests 311 differs from the level 341 of the second pair of foot rests 313 by an increment 343. Similarly, die level 345 of the first section 305 of the saddle seat 303 differs from the level 347 of the second section 307 of the saddle seat assembly 303 by an increment 349. It is preferable to maintain a consistent correlation between increment 343 and increment 349 such that passenger comfort and control during RUV operation is maximized. For example, as the increment 343 is increased, similarly, the increment 349 should also be increased. In this manner, level 347 and level 341 correlate to each other and accommodate the passenger.

Alternatively, the increments 343 and 349 may be individually increased or decreased to better suit respective passengers having larger or smaller body proportions. For example, for a passenger having shorter legs, increment 343 may be increased, or increment 349 may be decreased. In this manner, level 347 of the second section 307 of the saddle seat assembly 303 is positioned closer to level 341 of the second pair of foot rests 313, accommodating the passenger's shorter legs. Similarly, for a passenger having longer legs, increment 343 may be decreased, or increment 349 may be increased. In this manner, level 347 of the second section of the saddle seat assembly 303 is positioned further away from the level 341 of the second pair of foot rests 313, accommodating the passenger's longer legs.

It should thus be recognized that the multi-place multi-planar elongated saddle seat assembly 303, the multi-place multi-planar foot rest assemblies 309, and the grip handles 315, alone or in combination provide a significant advancement over all terrain vehicle configurations of the prior art. These elements, alone or in combination serve to increase operator and passenger comfort and control during RUV travel. For example, the multi-place multi-planar saddle seat assembly 303 improves passenger comfort and safety by elevating the passenger's head above the driver's head, such that the passenger can see the path of travel of the RUV and anticipate changes in travel and rough terrain encountered by the RUV. The grip handles 315 provide stationary points on the RUV for the passenger to grip. The multi-place multi-planar foot board assemblies 309 safely position the passenger's feet away from the driver's feet and out of the way during RUV operation. These and the various additional unique features represent significant and desirable improvements over all terrain vehicles taught by the prior art.

It is recognized that various equivalents, alternatives and modifications are possible within the scope of the appended claims. Some of such variations are commonly known as suspension tuning to yield the appropriate ride quality for the respective vehicle, wherein various spring rates, preloads and damping rates are tested in combination. These adjustments all lie within the scope of the appended claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recreational utility vehicle (RUV) capable of accommodating multiple passengers, the RUV comprising:
    right and left front wheels and right and left rear wheels, wherein the front wheels are spaced apart from the rear wheels by a wheelbase, and wherein each of the wheels is associated with a respective low-pressure tire having a respective internal pressure;
    right and left front fenders respectively extending behind respective rear edges of the right and left front tires, respectively, and right and left rear fenders respectively extending in front of respective front edges of the right and left rear tires, respectively;
    a longitudinally elongated multi-place, multi-planar saddle seat having a first section, a second section aft of and higher than the first section, and a transition portion positioned between the first and second sections;
    a longitudinally elongated frame to which the wheels, fenders and seat are coupled at least indirectly, the longitudinally elongated frame being sufficiently elongated to accommodate the saddle seat;
    front and rear suspensions coupled to and spaced longitudinally along the frame, said front and rear suspensions being sufficiently sized and sprung to accommodate the wheelbase and the frame and the saddle seat;
    a handlebar and a rack supported at least indirectly by the longitudinally elongated frame, wherein at least a part of the rack is positioned behind the saddle seat;
    a pair of grip handles on laterally opposite sides of the saddle seat, wherein the grip handles are in addition to the handlebar and the rack, and wherein the grip handles are positioned forward of the part of the rack and aft of the first portion of the saddle seat; and
    right and left foot rest surfaces that are respectively positioned between the right front and rear fenders and the left front and rear fenders, respectively, and that do not extend rearward of the front edges of the right and left rear tires, respectively,
    wherein the transition portion of the multi-place, multi-planar saddle seat extends upwardly and rearwardly from the first section toward the second section for accommodating at least two riders in tandem; and
    wherein the second section of the multi-place, multi-planar saddle seat at least partially extends over at least one of a pair of drive shafts used for driving the front and the rear wheels.

2. The RUV of claim 1 wherein the wheelbase of the RUV is at least 45 inches.

3. The RUV of claim 1 wherein each of the right and left front wheels and each of the right and left rear wheels are laterally spaced apart to define a track and wherein the track is at least 36 inches measured at a centerline of the wheels.

4. The RUV of claim 1, further comprising an engine;
    wherein an output shaft of the engine is connected at least indirectly to the longitudinally elongated frame, the output shaft extending from the engine and connected through a power take-off shaft to a transmission and a pair of drive shafts to drive the right and left front wheels and the right and left rear wheels.

5. The RUV of claim 4, wherein the transmission is selected from a group consisting of a multiple speed gear transmission, a constant velocity transmission in conjunction with a gear-reducing transmission, an automatic transmission and an hydraulic transmission.

6. A recreational utility vehicle (RUV) capable of accommodating multiple passengers, the RUV comprising:
- right and left front wheels and right and left rear wheels, wherein the front wheels are spaced apart from the rear wheels by a wheelbase, and wherein each of the wheels is associated with a respective low-pressure tire having a respective internal pressure;
- right and left front fenders respectively extending behind respective rear edges of the right and left front tires, respectively, and right and left rear fenders respectively extending in front of respective front edges of the right and left rear tires, respectively;
- a saddle seat having a first portion, a second portion and a transitional portion extending in a manner that is at least partially non-horizontal, the transitional portion being positioned between the first and second portions, the second portion being behind the first portion;
- a longitudinally elongated frame to which the wheels, fenders and seat are coupled at least indirectly, the longitudinally elongated frame being sufficiently elongated to accommodate the saddle seat;
- front and rear suspensions coupled to and spaced longitudinally along the frame, said front and rear suspensions being sufficiently sized and sprung to accommodate the wheelbase and the frame and the saddle seat;
- an output shaft of an internal combustion engine that is connected at least indirectly to the longitudinally elongated frame, the output shaft extending from the engine and connected through a power take-off to a transmission and a pair of drive shafts to drive the front and rear wheels;
- a handlebar and a rack supported at least indirectly by the longitudinally elongated frame, wherein at least a part of the rack is positioned behind the saddle seat;
- a pair of grip handles on laterally opposite sides of the saddle seat, wherein the grip handles are in addition to the handlebar and the rack, and wherein the grip handles are positioned forward of the part of the rack and aft of the first portion of the saddle seat; and
- right and left foot rest surfaces that are respectively positioned between the right front and rear fenders and the left front and rear fenders, respectively, and that do not extend rearward of the front edges of the right and left rear tires, respectively,
- wherein at least one of the pair of drive shafts used to drive the front and rear wheels is positioned at least partially beneath the second portion of the saddle seat.

7. The RUV of claim 6 wherein the wheelbase of the RUV is at least 45 inches.

8. The RUV of claim 6 wherein each of the right and left front wheels and each of the right and left rear wheels are laterally spaced apart to define a track and wherein the track is at least 36 inches measured at a centerline of the wheels.

9. The RUV of claim 6, wherein the transmission is selected from a group consisting of a multiple speed gear transmission, a constant velocity transmission in conjunction with a gear-reducing transmission, an automatic transmission and an hydraulic transmission.

10. The RUV of claim 6, wherein the pair of grip handles are mounted to the longitudinally elongated frame or to the saddle seat.

11. The RUV of claim 6, wherein each of the right and left foot rest surfaces includes respective first and second protrusions that each extend, widthwise, at least mostly across the respective foot rest surface, the first and second protrusions of each respective foot rest surface being positioned in succession along a respective length of the respective foot rest surface, whereby the first and second protrusions of each respective foot rest surface are configured to facilitate positioning first and second feet in succession along the respective length of the respective foot rest surface.

* * * * *